(12) United States Patent
Sholev et al.

(10) Patent No.: US 11,592,339 B2
(45) Date of Patent: Feb. 28, 2023

(54) DEVICE AND METHOD FOR DETERMINING A MODEL RELATED TO A TEMPERATURE SHIFT

(71) Applicant: Intel Corporation, Santa Clara, CA (US)

(72) Inventors: Omer Sholev, Rishon Lezion (IL); Elan Banin, Raanana (IL); Ofir Degani, Nes-Ammim (IL); Assaf Ben-Bassat, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 559 days.

(21) Appl. No.: 16/727,966

(22) Filed: Dec. 27, 2019

(65) Prior Publication Data

US 2021/0199511 A1 Jul. 1, 2021

(51) Int. Cl.
| | |
|---|---|
| *G01K 7/00* | (2006.01) |
| *H04B 1/04* | (2006.01) |
| *H04B 17/13* | (2015.01) |

(52) U.S. Cl.
CPC ............ *G01K 7/00* (2013.01); *H04B 1/04* (2013.01); *G01K 2217/00* (2013.01); *H04B 17/13* (2015.01)

(58) Field of Classification Search
CPC ........ G01K 7/00; G01K 2217/00; H04B 1/04; H04B 17/13
See application file for complete search history.

(56) References Cited

U.S. PATENT DOCUMENTS

| | | | | |
|---|---|---|---|---|
| 5,524,285 | A * | 6/1996 | Wray ............... | H03F 1/3294 455/119 |
| 5,870,668 | A * | 2/1999 | Takano ............ | H03D 7/168 455/295 |
| 5,903,823 | A * | 5/1999 | Moriyama ....... | H03C 3/406 330/149 |
| 6,285,707 | B1 * | 9/2001 | Giles ................ | H01L 23/34 379/404 |
| 6,342,810 | B1 * | 1/2002 | Wright ............. | H03F 1/3252 330/129 |
| 6,697,436 | B1 * | 2/2004 | Wright ............. | G01N 27/4163 455/108 |
| 6,798,843 | B1 * | 9/2004 | Wright ............. | H03F 1/3294 330/149 |
| 2005/0057303 | A1 * | 3/2005 | Leffel .............. | H03F 1/3294 330/75 |
| 2006/0229036 | A1 * | 10/2006 | Muller ............. | H03F 1/3282 455/114.3 |

(Continued)

*Primary Examiner* — Nathaniel T Woodward
*Assistant Examiner* — Philip L Cotey
(74) *Attorney, Agent, or Firm* — Viering, Jentschura & Partner mbB

(57) ABSTRACT

A device may comprise: a storage for storing a reference output representing an output of an electrical circuit at a reference temperature; one or more processors, configured to: determine a temperature shift based on a comparison of an output of the electrical circuit sensed at a sensing temperature and the reference output; determine a plurality of coefficients of a model of the temperature shift, wherein the model implements one or more functions that associate the plurality of coefficients and a temperature with the temperature shift at the temperature.

19 Claims, 12 Drawing Sheets

(56) References Cited

U.S. PATENT DOCUMENTS

| | | | |
|---|---|---|---|
| 2006/0240786 A1* | 10/2006 | Liu | H04L 27/368 455/114.3 |
| 2011/0270590 A1* | 11/2011 | Aparin | H03F 1/3258 703/2 |
| 2015/0126141 A1* | 5/2015 | Arno | H03F 1/3241 455/114.3 |
| 2016/0080013 A1* | 3/2016 | Arno | H04B 1/0475 455/114.3 |
| 2017/0353163 A1* | 12/2017 | Gazneli | H03F 3/195 |
| 2018/0192379 A1* | 7/2018 | Gross | H03F 3/24 |

* cited by examiner

DEVICE AND METHOD FOR DETERMINING A MODEL RELATED TO A TEMPERATURE SHIFT

TECHNICAL FIELD

Various embodiments relate generally to wireless communications.

BACKGROUND

In the field of radio communication, transmitter (Tx) nonlinearities have a severe impact on the quality and accuracy of the communication. Tx nonlinearities may arise from multiple origins, e.g., including various combinations of amplitude modulation (AM) and phase modulation (PM), e.g., AMAM, AMPM, PMPM and PMAM. Conventionally, each nonlinearity is described by an integrated-non-linearity (INL) look-up-table (LUT), which holds the error for each given input value of the Tx. Digital pre-distortion (DPD) is a correction-method which utilizes the INL LUTs in order to compensate for the transmitter distortions.

However, such transmitter nonlinearities are temperature dependent. Therefore, the INLs need to be updated with temperature drifts. Conventionally, updating the LUTs requires a full calibration, in which the complete transmitter (Tx) nonlinearity is determined for the actual temperature and converted into updated LUTs. This process is time consuming and, as such, imposes severe constraints on the system.

Conventionally, the INL is not taken into account for multiple temperatures. Thus, the update is time consuming due to the length of the full calibration and the need to re-calibrate at every new temperature. Storing INL LUTs for multiple temperatures, in order to avoid re-calibrating the same temperature twice, is memory consuming, and thus of a limited benefit. It is desired to reduce the time required to update the INL LUTs.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following exemplary drawings, in which.

DESCRIPTION

Figure 1:
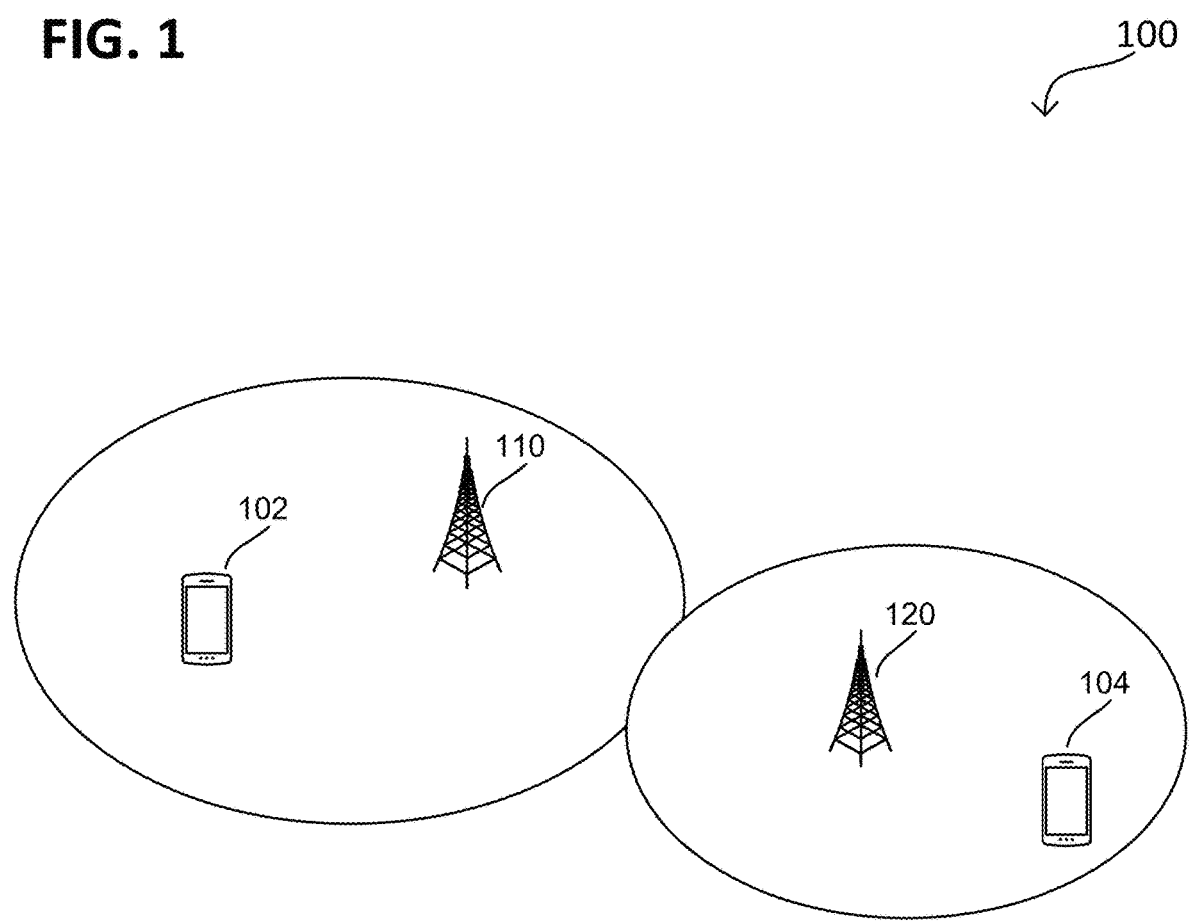
FIG. 1 shows an exemplary radio communication network according to some aspects.

According to various aspects, a mechanism for accelerating updating one or more LUTs after a detected temperature drift (temperature change) is provided. The mechanism utilizes the INL (e.g., provided by a LUT) determined at a base-temperature (also referred to as INL_base) and models the difference between INL_base and the INL at current temperature (also referred to as INL(t)). Since analog impairments tend to change smoothly with temperature drift, the modeling device may optionally use a piecewise polynomial to model the temperature shift in order to enhance the accuracy regarding the actual physical behavior of the electrical circuit. The advantage of this approach is that the residual INL is modeled using much fewer parameters, which reduces the required time for updating the INL LUT.

According to various aspects, one or more functions are provided to model the temperature shift (also referred to as modeling). The modeling may be based on a model implementing one or more functions, for which a plurality of coefficients is determined. A temperature-shift-correction mechanism may be configured to determine a LUT based on the result of the modeling at a given temperature. The temperature-shift-correction mechanism may accurately determine the LUT at given temperature that is between the base temperature and the current temperature based on the result of the model. Thus, the LUT can be updated without a full re-calibration. Saving the plurality of coefficients reduces the memory consumption, e.g., compared with saving multiple LUTs, and reduces the time for adapting to a new temperature, e.g., compared with a full re-calibration. This enables a fast update of the entire LUT according to the actual temperature, whenever the temperature drift necessitates.

According to various aspects, the coefficients (e.g., polynomials-coefficients) are a function of temperature. An extended model may implement the temperature dependent coefficients to directly estimate a complete INL LUT at any temperature using only few temperature-points (e.g., at least two).

According to various aspects, a reduced calibration time may be provided by modeling a temperature-dependency of INL-LUTs. Taking advantage of the fact that the INL may change smoothly over temperature, lends itself to the ability to fit a model with the minimal number of (unknown-) coefficients. Accordingly, a model of the temperature shift is provided, that implements the temperature dependency of the coefficients, e.g., over a range of temperatures. That is, how the coefficients of the one or more functions change over a range of temperatures.

According to various aspects, the reduced number of coefficients (fewer coefficients) allows for a faster adaption of the system, and thus, improves time limitations on the system. Modeling the temperature dependency of the coefficients (that is, they are a function of temperature) allows us to predict changes in INL for a new temperature, without the need of any additional calibration. Using fewer coefficients to describe the INL LUTs (in all temperatures) reduces the memory requirements and allows the system to save past results instead of re-calibrating.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc. It may be understood that the components of the vector and/or matrix notation may, not necessarily be limited to numerals (e.g., acting as scalar coefficients for a set of basis vectors), but may also include other components, such as functions, operators, and the like.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel.

10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

The terms "radio communication network" and "wireless network" as utilized herein encompasses both an access section of a network (e.g., a radio access network (RAN) section) and a core section of a network (e.g., a core network section).

Throughout, reference is made to an integral nonlinearity (INL) as an exemplary measure of the deviation between the reference output and the sensed output for demonstrative purposes, and is not intended to be limiting. The INL is measure of performance of an electrical circuit (e.g., a converter), such as a digital-to-analog (DAC) and analog-to-digital (ADC) converter. The INL may refer to the respective outputs of the electrical circuit at identical temperatures. For each temperature, the INL may be unique, that is, the INL may be temperature dependent.

Referring to a DAC, the INL is a measure of the deviation between the reference output value and the actual measured output value for a certain input code. The input code may have a value from a predefined interval, e.g., depending on the range of the code, e.g., ranging from 0 to 2048. Referring to a ADC, the INL is the deviation between the ideal input threshold value and the measured threshold level of a certain output code. The measurement of the INL may be performed after offset and gain errors have been compensated. One option is to provide the INL for every possible input (e.g., input code), that is, the INL may be provided as a function of the input. Another option is to provide a single value of the INL, e.g., the maximal INL or the average INL for the whole input range.

The INL may be measured in least significant bit (LSB). The LSB refers to the bit position in a binary integer giving the units value, that is, determining whether the number is even or odd. The LSB is sometimes referred to as the low-order bit or right-most bit, due to the convention in positional notation of writing less significant digits further to the right. It is analogous to the least significant digit of a decimal integer, which is the digit in the ones (right-most) position.

It may be understood, that the deviation between the reference output and the actual sensed output of the electrical circuit may be also provided by a measure of another type or in other units, to which the references made to INL may analogously apply. Therefore, the INL may be understood as serving as an example for a parameter representing the deviation of the actual output from the reference output. The references made to INL, its principle and processing, may analogously apply to other parameters representing the deviation of the actual output from the reference output.

The ideal transfer function of a DAC or ADC may be a straight line. The INL measurement depends on what line is chosen as reference output. One option is to set the preset line that connects the endpoints of the ideal transfer function, in other words, the line connecting the smallest and largest measured input/output value, as reference output. Another option is to set an average of the actual output of the electrical circuit at multiple temperatures, e.g., out of a temperature interval, as reference output. Yet another option is to set the output of the electrical circuit at a single temperature (also referred to as reference temperature) as reference output. The reference temperature or the temperature interval may be chosen to meet the requirements an operating conditions at best. For example, the reference temperature may be a standard temperature (e.g., 0° C., 20° C. or 25° C.).

Herein, reference is made to an output of the electrical circuit at the reference temperature set as reference output for demonstrative purposes, and is not intended to be limiting. The references made to the reference output may analogously apply to other options of setting the reference output, e.g., as outlined above. As further examples, the reference output may be defined universally for a type of electrical circuits (e.g., saved in a memory thereof) and may be used for modeling a plurality of different electrical circuits of the same typ. Analogously, multiple universal reference outputs may be stored in a database, each of which may be assigned to one or more types of the electrical circuit.

In the following figures, reference is made to a radio communication network as exemplary operation environment of an electrical circuit as part of a transmitter, for demonstrative purposes, and is not intended to be limiting. The references made to the radio communication network may analogously apply to other operation environments of the electrical circuit.

FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, gNodeBs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

Figure 2:
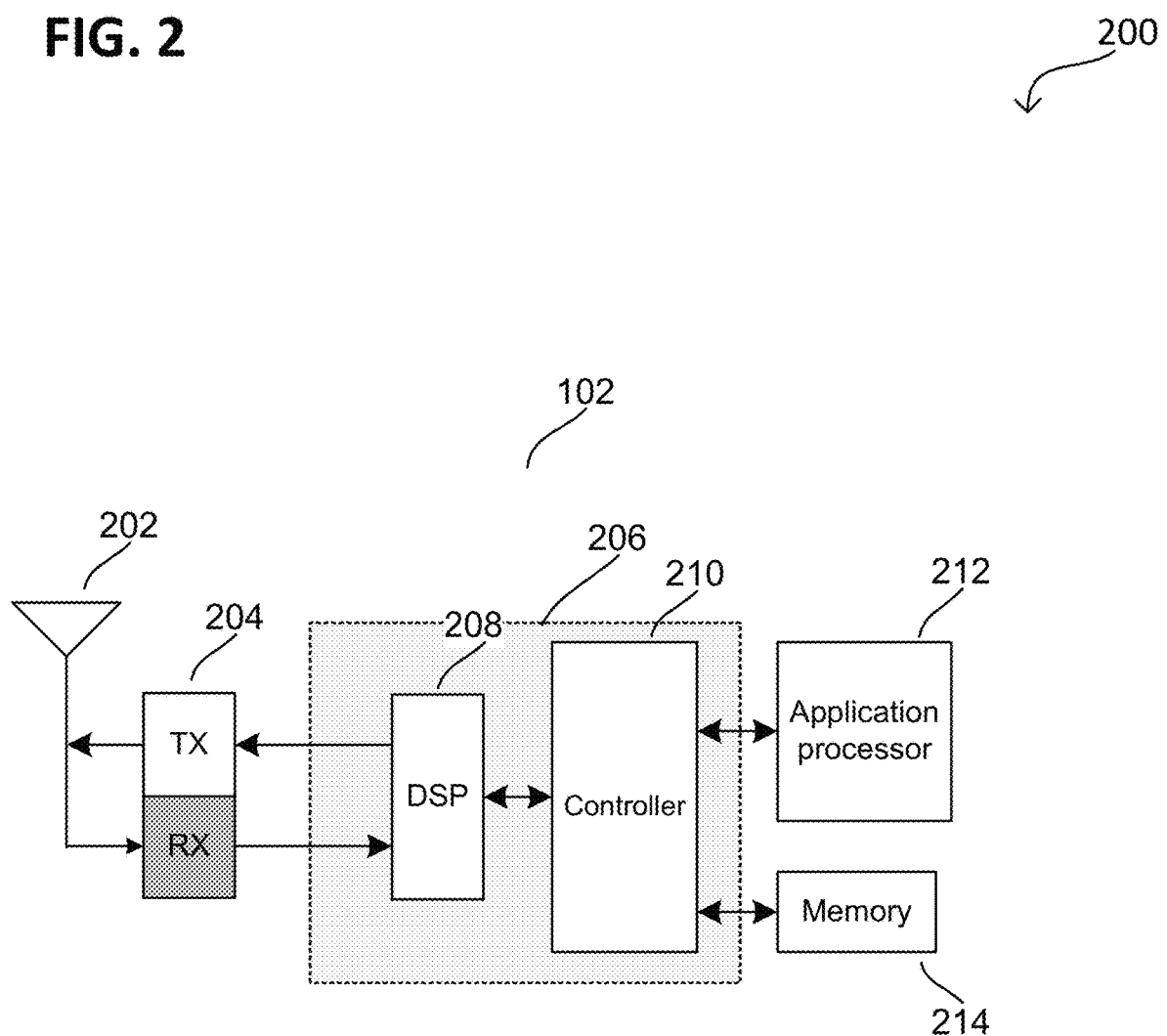
FIG. 2 shows an exemplary internal configuration of terminal device according to some aspects.

FIG. 2 shows an internal configuration of terminal device 102 according to some aspects in a schematic diagram 200. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects, terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies.

Various of the above components or group of components of the terminal device 102 that provide a signal path may be examples for the electrical circuit as referenced herein. In analogy, various of the respective components or group of components of network access nodes 110 and 120 serving as counterparts to the components of the terminal device 102 may be examples for the electrical circuit as referenced herein.

In general, the electrical circuit may be configured to provide a signal as output (also referred to as output or output signal) based on another signal as input (also referred to as input or input signal). For example, the input may be a digital input and the output may be an analog output or vice versa. A digital input refers to a time-discrete and/or value-discrete signal. An analog input refers to a time-continuous and/or value-continuous signal.

For example, the circuit may include or may be a DAC. An example of a DAC is a digital-to-time converter (DTC). In another example, the electrical circuit may include or may be a power amplifier (PA). In yet another example, the electrical circuit may include or may be a signal modulator (configured to modulate a signal). Examples for the modulation of the signal provided by the signal modulator include amplitude modulation, frequency modulation, phase modulation, pulse width modulation, delta modulation, and polarization modulation. In yet another example, the electrical circuit may include or may be a digital signal processor.

A DAC refers to a converter that converts a digital signal into an analog signal. A DTC may be used in time domain signal processing to adjust the propagation delays of signals paths with digital control words. The operation of the DTC is analogous to the DAC used in analog signal processing.

Herein, reference is made to a DTC as example for the electrical circuit for demonstrative purposes, and is not intended to be limiting. The references made to DTC may analogously apply to electrical circuits of other types, e.g., as outlined above. The input code refers to the value of the digital input fed to the DTC. The input code may have a value out of a predefined interval, e.g., ranging from 0 to 2048. Referring to the DTC, the input code is referred as to DTC code.

Figure 3:
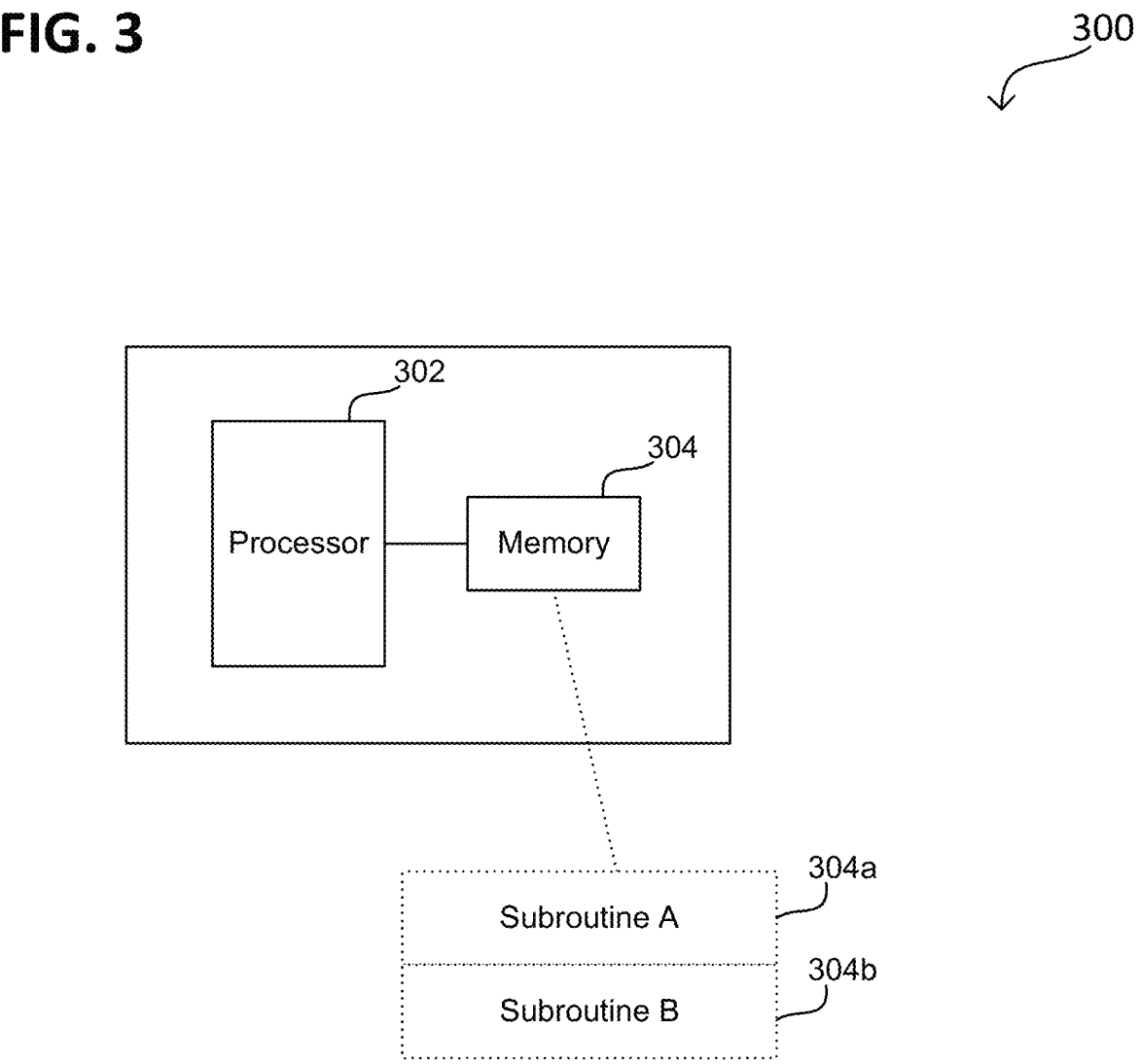
FIG. 3 shows an exemplary internal configuration of modeling device for implementing methods according to some aspects.

FIG. 3 illustrates an exemplary internal configuration of modelling device 300 according to some aspects in a schematic diagram. Modeling device 300 may include processor 302 and memory 302. Processor 302 may be a single processor or multiple processors, and may be configured to retrieve and execute program code to perform the determining, sensing, fitting, calculation, comparing, and/or storing as described herein. Memory 302 may be a non-transitory computer readable medium storing instructions for one or more of a subroutine 304a and subroutine 304b.

subroutine 304a, and/or subroutine 304b may each be an instruction set including executable instructions that, when retrieved and executed by processor 302, perform the functionality of methods as described herein. In particular, processor 302 may execute subroutine 304a to determine a temperature shift based on a comparison (also referred to as output comparison) of an output of the electrical circuit sensed at a sensing temperature and the reference output. Processor 302 may execute subroutine 304b to determine a plurality of coefficients of a model of the temperature shift (also referred to as temperature shift model), wherein the temperature shift model implements one or more functions that associate the plurality of coefficients and a temperature with the temperature shift at that temperature. The determination of the plurality of coefficients of the temperature shift model (also referred to as modeling) is explained in more detail in the below.

One or more of the following may be stored in the memory 304: one or more outputs of the electrical circuit sensed at a sensing temperature; one or more reference outputs, each representing an output of an electrical circuit at a reference temperature; one or more models (as described herein); one or more functions, one or more pluralities of coefficients.

Optionally the modeling device 300 may include one or more sensors to sense one or more outputs of the electrical circuit, e.g., at the same temperature and/or at various temperatures. For example, the processor 302 may execute a subroutine to sense the one or more outputs of the electrical circuit by the one or more sensors and/or a temperature of the electrical circuit, at which each of the one or more outputs is sensed. For example, at least one of the one or more sensors may be provided by a vector signal analyzer (VSA) and/or a scope (oscilloscope) configured to sense an output of the electrical circuit. For example, at least one of the one or more sensors may be a temperature sensor configured to sense the temperature of the electrical circuit. If the modeling device 300 does not include the one or more sensors or is not sensing, the respective output(s) of the electrical circuit may be provided to the modeling device 300.

Figure 4:
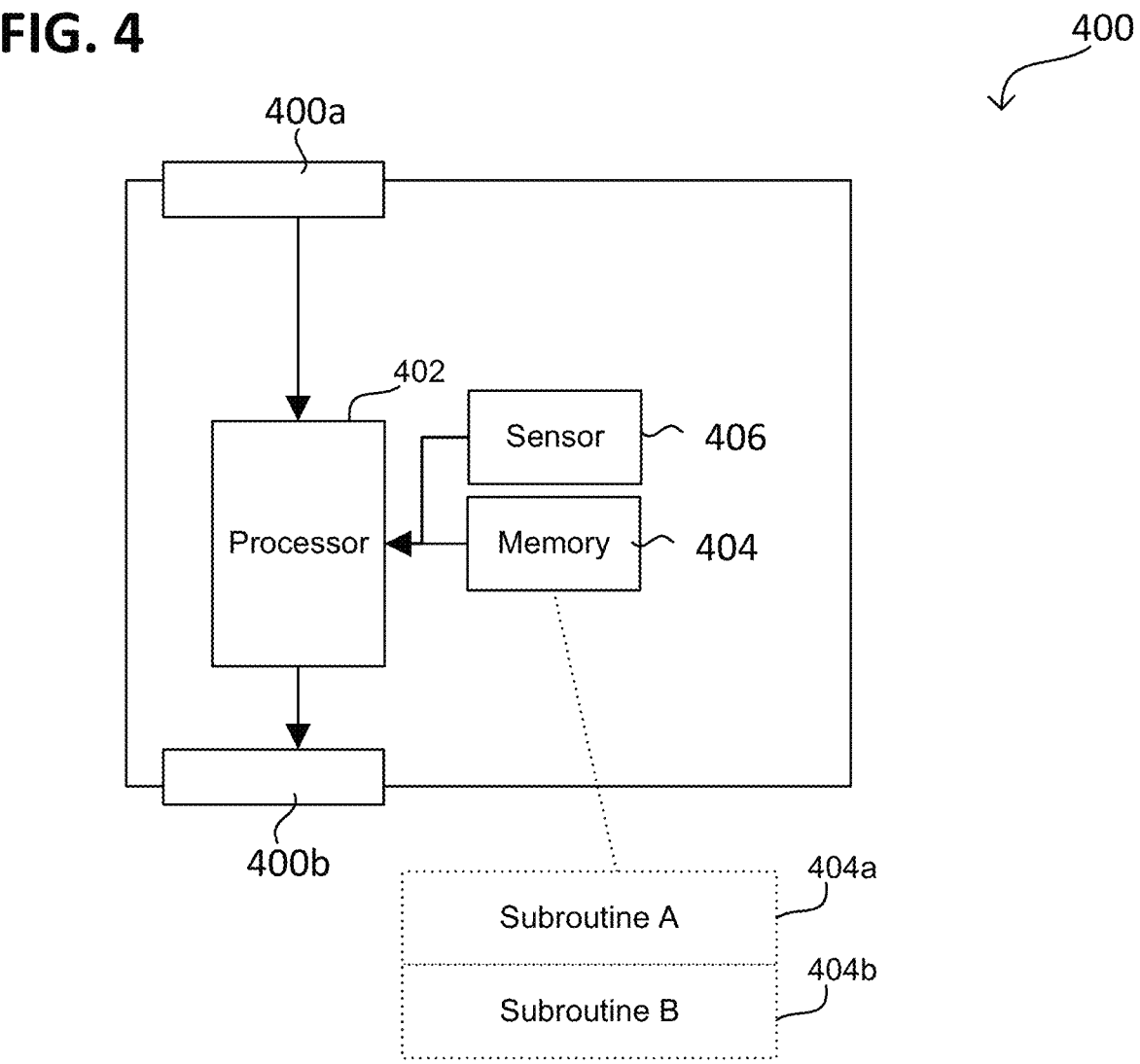
FIG. 4 shows an exemplary internal configuration of electrical circuit according to some aspects.

FIG. 4 illustrates an exemplary internal configuration of electrical circuit 400 (e.g., a DTC) in a schematic diagram according to some aspects. Electrical circuit 400 may include processor 402, memory 404, input node 400a, output node 400b, and sensor 406. Processor 402 may be a single processor or multiple processors, and may be configured to retrieve and execute program code to perform and/or adjust the conversion of an input signal received at the input node 400a and output an output signal at the output node 400b. The output signal may be provided based on the input signal.

Herein, reference is made to a digital code as input signal for demonstrative purposes, and is not intended to be limiting. The references made to the digital code may analogously apply to input signals of other types.

Memory 402 may be a non-transitory computer readable medium storing instructions for one or more of a subroutine 404a and subroutine 404b.

Subroutine 404a, and/or subroutine 404b may each be an instruction set including executable instructions that, when retrieved and executed by processor 402, perform the functionality of the electric circuit as described herein. In particular, processor 402 may execute subroutine 404a to update a converting scheme based on a temperature of the electrical circuit 400 sensed by sensor 406 and based on a temperature correction model. Processor 302 may execute subroutine 304b to provide the output signal based on the input signal and the converting scheme. Subroutine 404a may implement the functions of a temperature-shift-correction mechanism of the electrical circuit.

In general, the temperature correction model may associate the plurality of coefficients and the temperature to electrical circuit 400 with a parameter (also referred to as correction parameter) that represents the correction to be applied to the output of the electrical circuit 400. As example, the correction parameter may include or may be formed from an INL. The correction parameter may be fed to the converting scheme to update the converting scheme. As example, the temperature correction model may include or may be formed from a counterpart of the temperature shift model as example.

The converting scheme may, if processed by processor 402, assign the input value with the value to be output by the electrical circuit 400. As example, the converting scheme may include or may be formed from look-up-table (LUT), e.g., an INL LUT. The LUT may indicate the deviation for each given input value at the temperature. The LUT may be updated by the temperature correction model, e.g., using the plurality of coefficients stored in the memory 404.

The plurality of coefficients determined by the modeling device 300 may be transferred to the temperature-shift-correction mechanism of the electrical circuit 400 (e.g., stored in memory 404). For this purpose, the electrical circuit 400 and the modeling device 300 may each include a communication interface for transferring the plurality of coefficients from the modeling device 300 to the electrical circuit 400. In general, the communication interface may be coupled to the processor, which provides for storing data received via the communication interface to the memory 404. For example, one or more of the subroutines may be stored or updated. This allows to program the electrical circuit 400. As illustrative example, the input node 404a may be used communication interface.

Analogously, the temperature correction model may be stored by the temperature-shift-correction mechanism of the electrical circuit 400 (e.g., in memory 404). For example, the temperature shift model may be set up by the plurality of coefficients and may be stored as temperature correction model in the temperature-shift-correction mechanism (e.g., in memory 404) of the electrical circuit 400.

Accordingly, one or more of the following may be stored in and/or transferred to the memory 404: the temperature correction model and/or the plurality of coefficients; the converting scheme, INL_base, the reference output.

It may be understood that the above described configuration of the electrical circuit 400 is exemplary. For example, the functions of the temperature-shift-correction mechanism may be implemented in another way (e.g., by separate hardware or software or a mixture thereof) that allows to update the temperature-shift-correction mechanism by providing the plurality of coefficients to the temperature-shift-correction mechanism.

In the following, reference is made to a DTC as example for the electrical circuit 400 for demonstrative purposes, and is not intended to be limiting. The references made to DTC may analogously apply to electrical circuits of other types.

Figure 5:
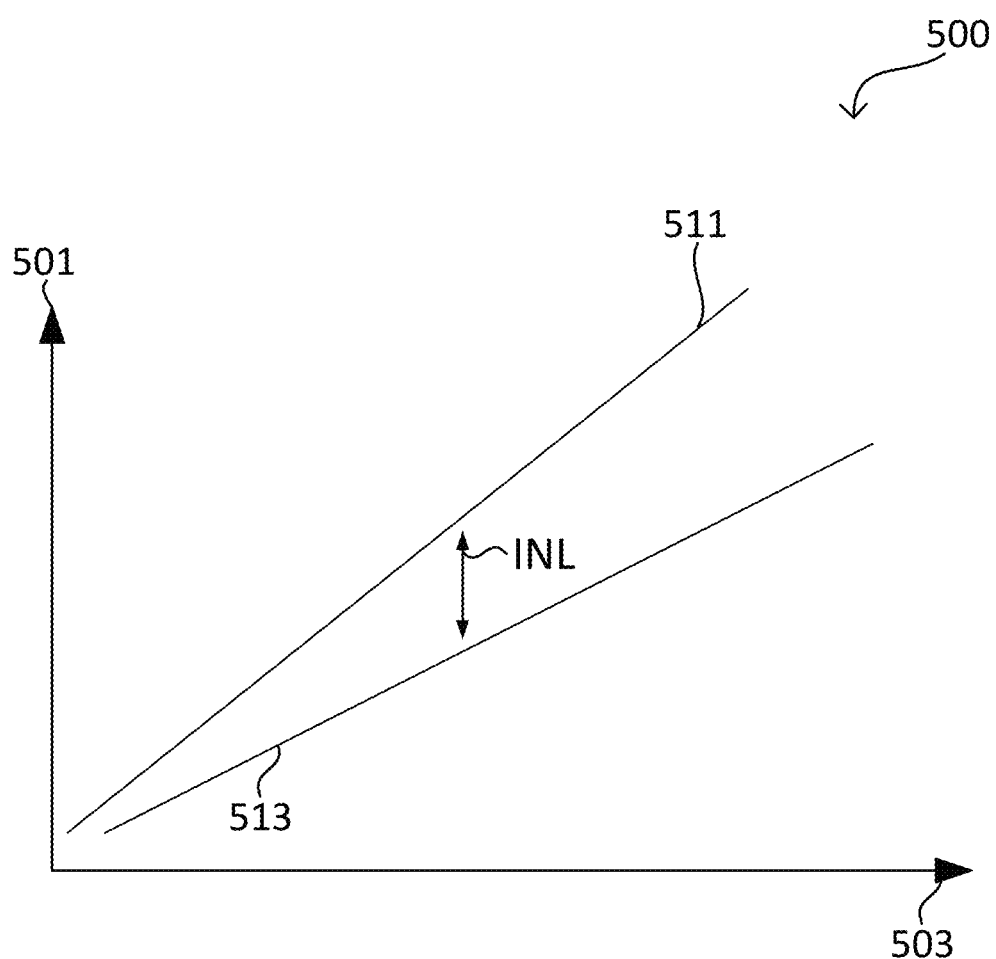
FIGS. 5 to 7 show an exemplary comparison of an output of the Digital-to-Time Converter (DTC) according to some aspects.

FIG. 5 illustrates an exemplary comparison of outputs of a DTC 400 in a schematic diagram 500, in which the output 501 of the DTC 400 is depicted over the input 503 of the DTC 400 for an exemplary reference temperature (line 511) and an exemplary sensing temperature (line 513). As mentioned above, an output 501 of the DTC 400 sensed at the reference temperature may be used as reference output. It may also be understood that said temperatures used herein are exemplary, and other temperatures may be used, e.g., covering the acceptable operation temperatures of the DTC 400.

Here, the INL of the DTC 400 is used as parameter (also referred to as shift parameter) representing the temperature shift 501 (that is, the temperature dependent deviation of the outputs) for demonstrative purposes, and is not intended to be limiting. It may be understood that other parameters representing the temperature shift may also be used, to which the references made to the INL may apply analogously.

In the following, the INL is used to indicate the output of the DTC 400 at a certain sensing temperature, which facilitates deriving the actual temperature shift of the output at the temperature. Illustratively, the INL at the reference temperature is zero at all input values, wherein the INL at a sensing temperature differs therefrom.

Figure 6:
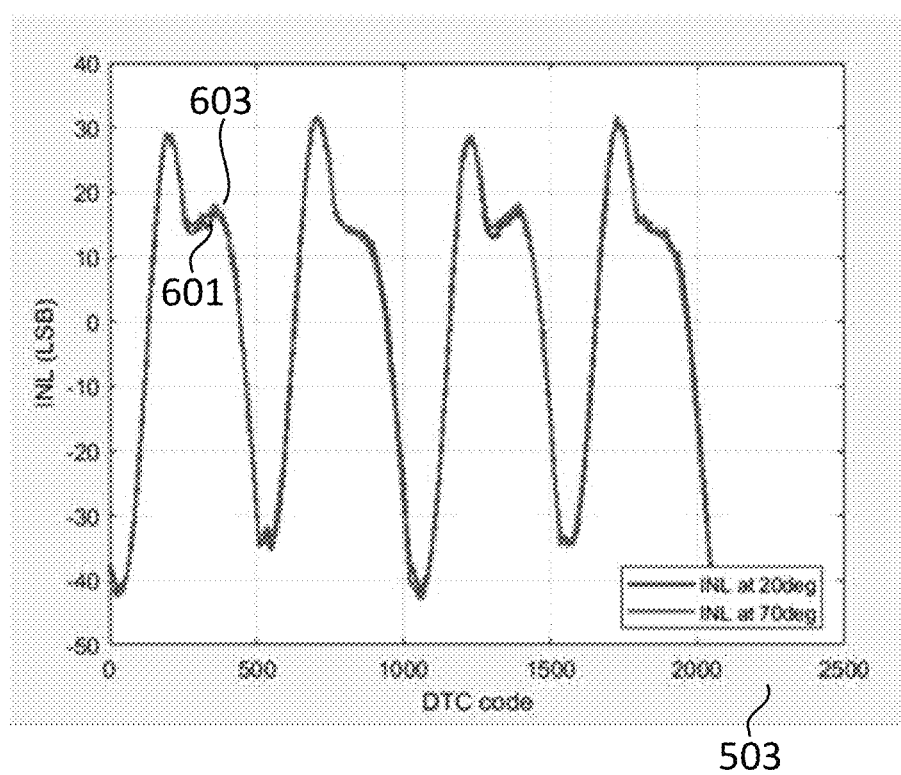

FIG. 6 illustrates an the INL as an exemplary comparison of an output of the DTC 400 sensed at different sensing temperatures $t_1$ and $t_2$ in a schematic diagram 600, in which the temperature shift of the output is depicted over the input 503 of the DTC 400 for an exemplary sensing temperature (see line 601) of $t_1=20°$ C. and exemplary sensing temperature of $t_2=70°$ C. (see line 603). As mentioned above, an output of the DTC 400 at a temperature different to 20° C. and to 70° C. may be used as reference output. Illustratively, line 601 represents the $INL(t_1)=O(t_1)-O(t_0)$ and line 603 represents the $INL(t_2)=O(t_2)-O(t_0)$, in which $O(t_1)$, $O(t_2)$ denote the output of the DTC 400 at the sensing temperatures $t_1$ and $t_2$ and $O(t_0)$ denotes the output of the DTC 400 at the reference temperature to.

As mentioned above, the INL of the DTC 400 may be used as parameter representing the temperature shift and the DTC code is used as parameter representing the input 503 of the DTC 400. It may be understood that also other parameters representing the temperature shift or the input 503 may be used. The input code may have a value out of a predefined interval, e.g., ranging from 1 to 2048 for a binary input code of 10 bit. Input codes of other bit size, e.g., less or more, may be used according to the requirements.

Also, the difference (INL_diff) between $INL(t_2)$ and $INL(t_1)$ may be used as shift parameter representing the temperature shift of the DTC 400 between the two sensing temperatures $t_1$ and $t_2$ as outlined in the following. The difference between $INL(t_2)$ and $INL(t_1)$ is equivalent to the difference between $O(t_2)$ and $O(t_1)$. In other words, $INL\_diff=INL(t_2)-INL(t_1)=O(t_2)-O(t_1)=\Delta O(\Delta t)$. The term $\Delta O(\Delta t)$ denotes the shift in the output induced by the temperature shift.

It may be understood that beside INL and INL_diff, analogously, also other types of shift parameter (e.g., equivalent thereto) may be used based on the comparison between two outputs of the DTC 400 at different temperatures (e.g., as result thereof).

Figure 7:
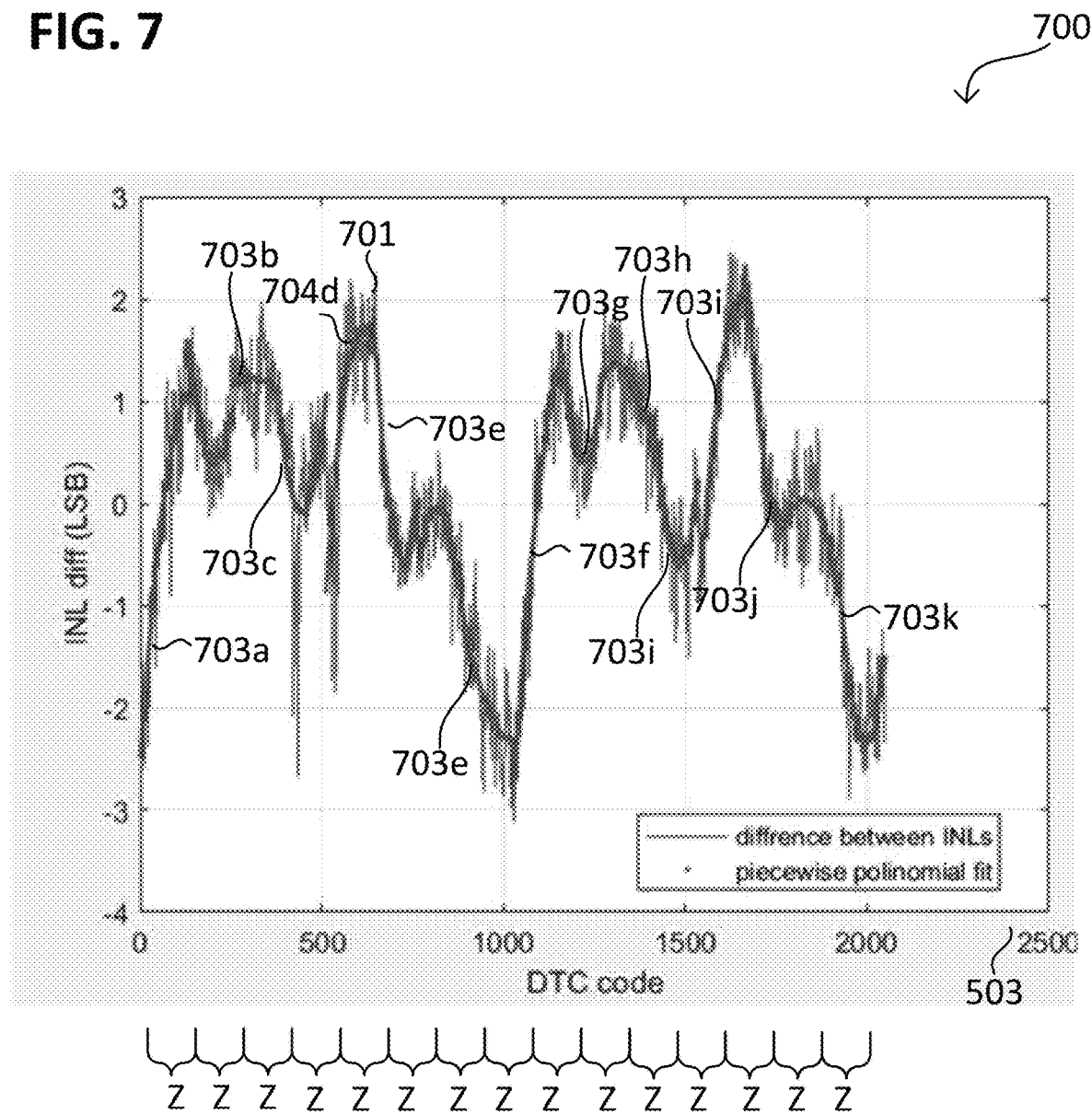

FIG. 7 illustrates INL_diff as an exemplary result of the comparison of an output of the DTC 400 sensed at different temperatures in schematic diagram 700, in which INL_diff representing the temperature shift is depicted over the DTC code for a temperature shift $\Delta t=t_2-t_1$ of 50° (see line 701), e.g., using the outputs of the DTC 400 at 20° C. and 70° C.

In the following, the modeling is described in detail based on INL_diff as result of the output comparison for demonstrative purposes, and is not intended to be limiting. The references made to the modeling based on INL_diff may analogously apply to another way of modeling, e.g., using another shift parameter.

FIG. 7 illustrates multiple functions 703a to 703k that are fitted to INL_diff (also referred to as piecewise fit). Each of the functions 703a to 703k may be fitted within an interval Z of the input range 503. This facilitates an accurate modeling. In the following, the fitting is explained for one of the multiple functions 703a to 703k, which may be applied analogously to each of the multiple functions 703a to 703k.

In the following, reference is made to the temperature depended $INL\_diff(t)=INL(t)-INL(t_0)$. The temperature depended INL_diff(t) may be understood as representing the result of the output comparison. The modeling device may be configured to determine the model, one or more functions and/or the plurality of coefficients based on the result of the output comparison.

For various temperatures $t=t_0+\Delta t$, INL(t) may be modeled as sum of a base-INL (also referred as $INL(t_0)$) and a polynomial function. An exemplary function, to which the fitting is applied may be $$INL(t=t_0+\Delta t) \approx INL(t_0)+q_2 \cdot c^2+q_1 \cdot c+q_0.$$

The coefficients $q_2$, $q_1$, $q_0$ may be used as temperature independent polynomial fitting parameters. The parameter c represents the DTC code.

The above relation $INL(t=t_0+\Delta t)$ represents the temperature induced shift of the output of the DTC 400 for a temperature difference of $\Delta t=t-t_0$. The base-INL ($INL(t_0)$) may be a fitting parameter of may be predetermined, e.g., using the INL at a reference temperature. Additionally or alternatively, the full calibrated DTC 400 at a reference temperature may be used for the determination of the base-INL ($INL(t_0)$).

For example, a plurality of coefficients $q_2$, $q_1$, $q_0$ may be determined for each sensing temperature t and/or for each interval Z, which, for example, may be fed to the temperature-shift-correction mechanism. It should be noted that each interval Z may not be equivalent. For example, the interval for function 703a may differ from (e.g., be greater or less than) the interval for function 703b. The modeling device may be configured to determine the actual range and/or number of intervals based on the output comparison, e.g., the result of the output comparison (e.g., represented by INL_diff(t)).

Another example for the modeling that allows for a further reduction of the total number of coefficients is explained in the following.

According to various aspects, it was recognized that the values of the coefficients $q_2$, $q_1$, $q_0$ may shift with the temperature, e.g., relatively smoothly. This enables to introduce a continuous temperature dependency to INL. For example, the temperature dependency may be introduced by assuming a linear temperature dependency of the coefficients $q_2$, $q_1$, $q_0$.

An exemplary function, to which the temperature dependency is introduced may be $$INL(t) \approx INL(t_0) + (a_2 t + b_2) \cdot c^2 + (a_1 t + b_1) \cdot c + (a_0 t + b_0)$$

In this notation, the non-linear dependency (e.g., having the grad of 2) from c and the linear dependency (e.g., having the grad of 1) from t is visible.

The coefficients $a_i$, $b_i$ (i=0, 1, 2) are used as temperature independent linear fit parameters to temperature shift model the temperature dependency of the coefficients $q_2$, $q_1$, $g_0$. As it can be seen from the above, the temperature dependency of INL may be modeled a continuous temperature dependency or discrete temperature dependency, resulting in a set of coefficients for each of the functions.

Generally, the higher the number of coefficients per function is, the higher the modelling accuracy may be. For fitting the temperature dependency, the function may be fitted using one or more temperature dependent outputs of the DTC 400.

As mentioned above, a piecewise modeling may be used for the DTC 400. Each function may associate an interval of the input range (as domain of the function) to the temperature shift of the output (as codomain). For example, the interval Z or each interval Z may include 256 values of the DTC code. The higher the number of intervals, the higher the modelling accuracy may be, e.g., due to the increasing number of functions and, thus, increasing number of coefficients. For example, for a minimum of coefficients at an acceptable modeling accuracy, the number of the coefficients per function may be about 10 or less, e.g., less about 6 or less, e.g., about 4 or less.

The number of intervals may be reduced without a deterioration of the modelling accuracy by increasing the number of coefficients per function and/or increasing the rank of each function (also referred to as degree of the function). For example, for a minimum of coefficients at an acceptable modeling accuracy, the number of intervals Z of the temperature shift model may be between about 2 and about 100, e.g., between about 5 and about 25.

The rank of the (e.g., polynomial) function or each (e.g., polynomial) function should be chosen according to the output (e.g., INL) behavior. For example, for a minimum of coefficients at an acceptable modeling accuracy, the rank (regarding c) per function of the temperature shift model may be 2 or more and/or 10 or less.

For example, for a minimum of coefficients at an acceptable modeling accuracy, the number of the coefficients of the temperature shift model may be less than about 1000, e.g., less than about 500, e.g., less than about 200, e.g., less than about 100, e.g., less than about 50.

In a more general manner, each of the above functions may be formulated in a vector and/or matrix notation. An exemplary function, formulated in such notation may be (e.g., in analogy to the Einstein notation):

$$INL(t) \approx INL(t_0) + \sum_{i=0}^{Q_c}\left(\sum_{j=1}^{Q_t} a_{i,j} t^j\right) \cdot c^i$$

Here, the $c^i$ are the basis vectors, in which the function INL(t) is noted. Illustratively, the outer sum (over i) may represent the product of the matrix $a_{i,j}$ with a vector of the c-space and the inner sum (over j) may represent the product of the matrix $a_{i,j}$ with the vector of the t-space. The components of the vector of the c-space may include exponentiations of c, e.g., the i-th component may include or may be formed from $c^i$. Analogously, the components of the vector of the t-space may include exponentiations of t, e.g., the j-th component may include or may be formed from $c^t$.

Of course, other basis vectors and/or spaces may be used also, e.g., thereby implementing other polynomial function, for example, such as a Taylor series. The function does not necessarily have to include polynomial components. For example, a Fourier series may be used also to provide for the function. In a more general manner, the function may include at least one polynomial component and/or at least one trigonometric component.

It may be understood that each single function, e.g., INL(t), above may be also decomposed in a plurality of less complex functions that provide, if composed with each other, an equivalent to the single function. An example of a less complex function may be a summand of the outer sum (over i) and/or inner sum (over j). Thus, the above coefficients may be associated with the temperature shift by a single function or a set of multiple (e.g., composed) functions. The above concept of the modeling and model may be understood as a guide and may be adapted according to the requirements, e.g., accuracy requirements, computing speed requirements, storage requirements, and/or computing capabilities. This requirement may be defined by the temperature-shift-correction mechanism, e.g., implemented in a terminal device.

The sensing of the output of the DTC 400 (e.g., for the INL estimation) may include transmitting a WLAN signal by a transmitter including the DTC 400, receiving the WLAN signal (e.g., via loop-back), and measuring the DTC-code dependent phase error. Beside the DTC INL, the phase error may be also affected by thermal-noise, jitter-noise and other impairments. In the first calibration (without previous knowledge of the INL), a long term signal may be used in order to average-out other impairments and isolate INL. When the temperature changes, the signal is already pre-distorted with INL-LUT from a previous temperature. This means for this example, essentially only the residual error is sensed.

According to various aspects, it was recognized that the residual error has much fewer parameters and therefore can be estimated much faster, e.g., utilizing the above temperature shift model and/or function(s).

In order to obtain the (e.g., polynomial) coefficients for each interval Z, a Least-Square fit, as example, may be performed to determine the phase-errors per DTC-code. Additionally or alternatively, one or more other curve fitting processes may also be applied.

Figure 8:
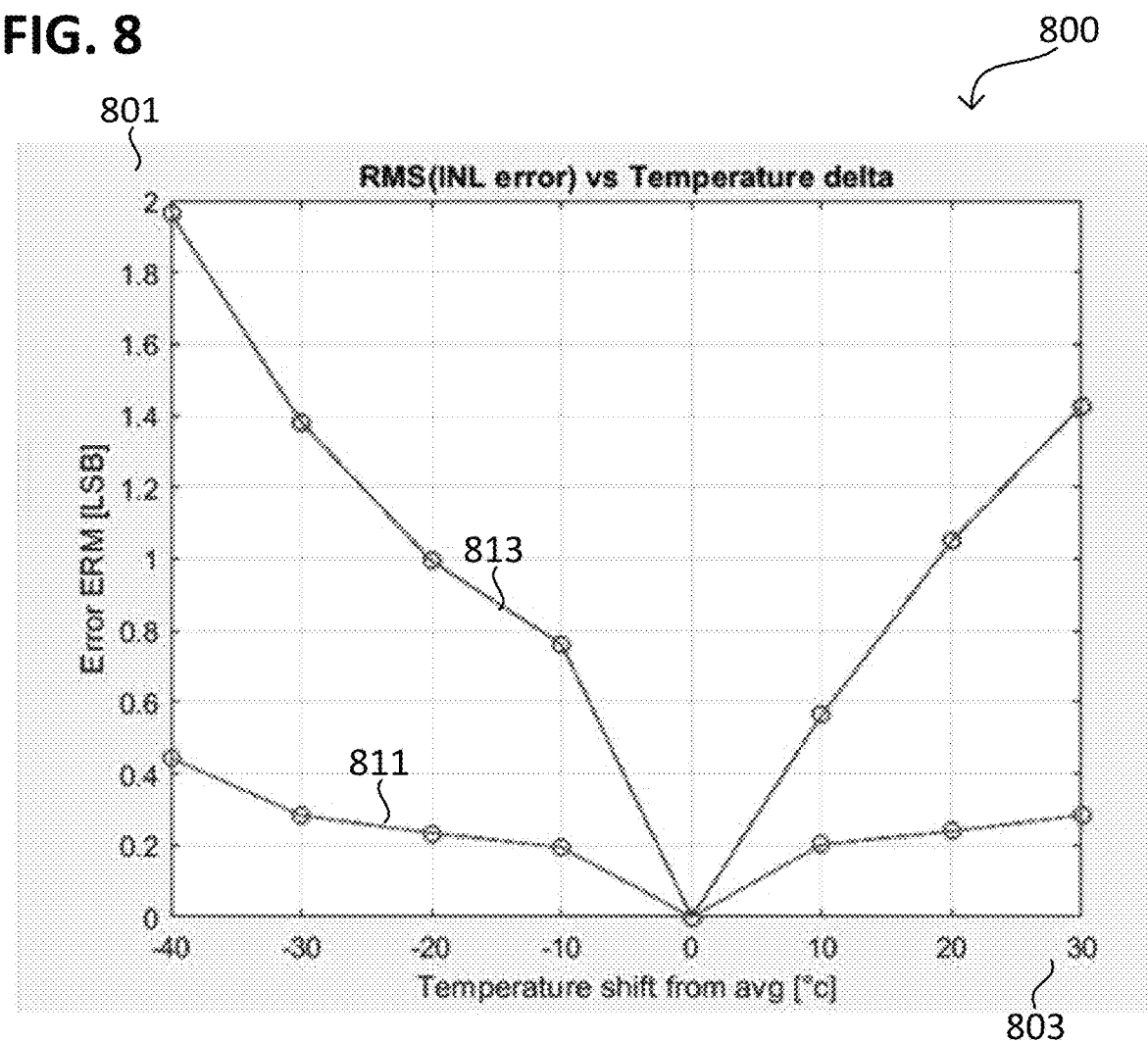
FIG. 8 shows the error in the output of the DTC according to some aspects.

FIG. 8 illustrates the error 801 in the output of the DTC over the temperature 803 in a schematic diagram 800, depicting a temperature dependent output of the DTC 400 corrected (see line 811) using the modeling as described herein and temperature dependent output of the DTC 400 corrected with the INL at 35° C. (line 813). The temperature shift model was tested on a TC3.6 at various temperatures ranging from −5° C. to 65° C. INL(35° C.) was set as INL_base and the temperature shift model was fitted for every temperature. The temperature 803 is noted as temperature offset from 35° C. The error 801 is represented as root-mean-square (RMS) of the difference (in LSB) between the sensed INL(t) and the output 813 corrected by INL(at 35° C.) and the output 811 corrected by INL(35° C.) and based on the temperature shift model.

As clearly visible from this comparison, the (e.g., polynomial) temperature shift model fits the INL-error very well, and only limits the accuracy to 0.2~0.4 LSB RMS.

Figure 9:
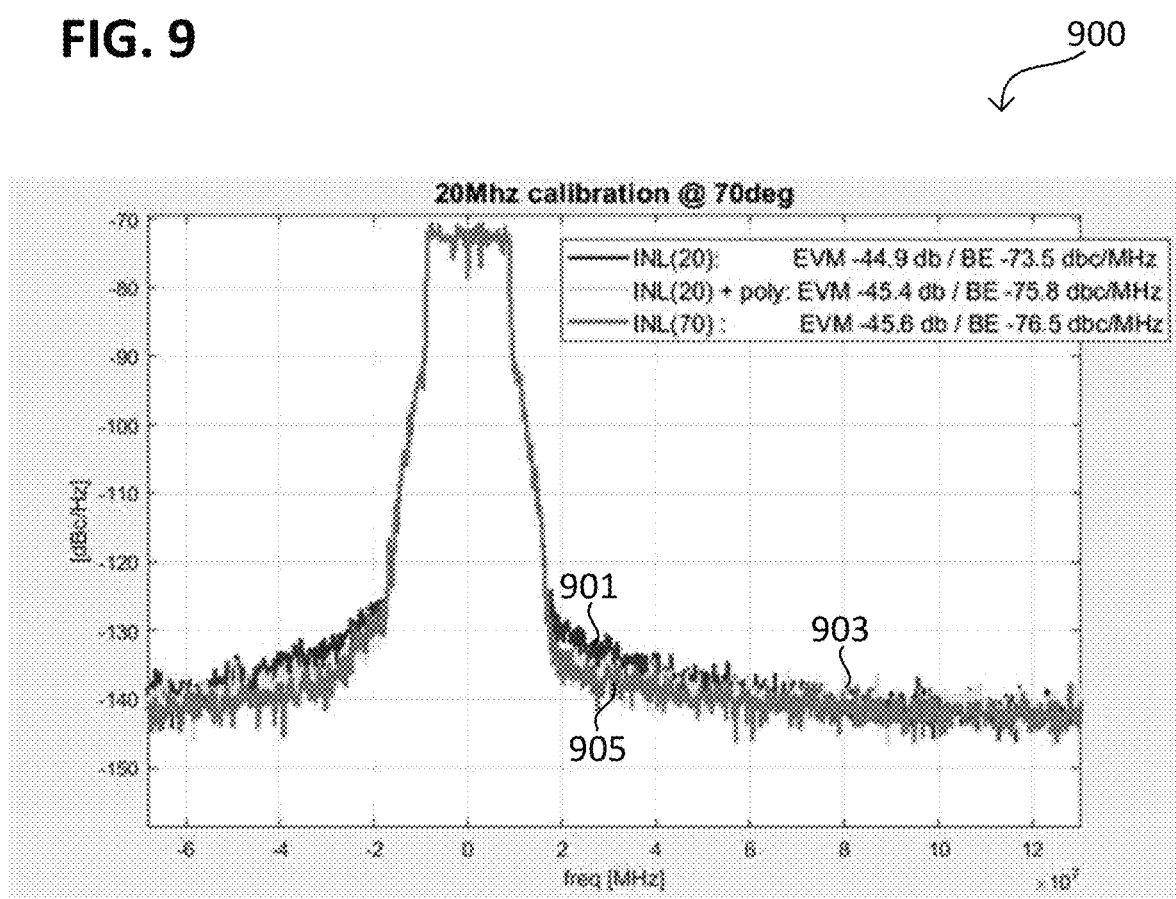
FIGS. 9 and 10 show the output of the DTC according to various aspects.

FIG. 9 illustrates an output of the DTC 400 according to various aspects in a schematic diagram 900, in which the dBc (decibels relative to the carrier) of the DTC 400 is depicted over the frequency of the output of the DTC 400. The dBc refers to the power ratio of the output signal of the DTC 400 to a carrier signal of the DTC 400, expressed in decibels. The illustrated diagram 900 may correspond to a TC3.6 DTx setup.

INL at 20° C. (line 901) was obtained and set as INL_base. A pre-distorted 20 Megahertz signal (with INL_base) was transmitted at 70° C. (line 905). The temperature shift model was fitted to the recorded signal and retransmitted (line 903).

Figure 10:
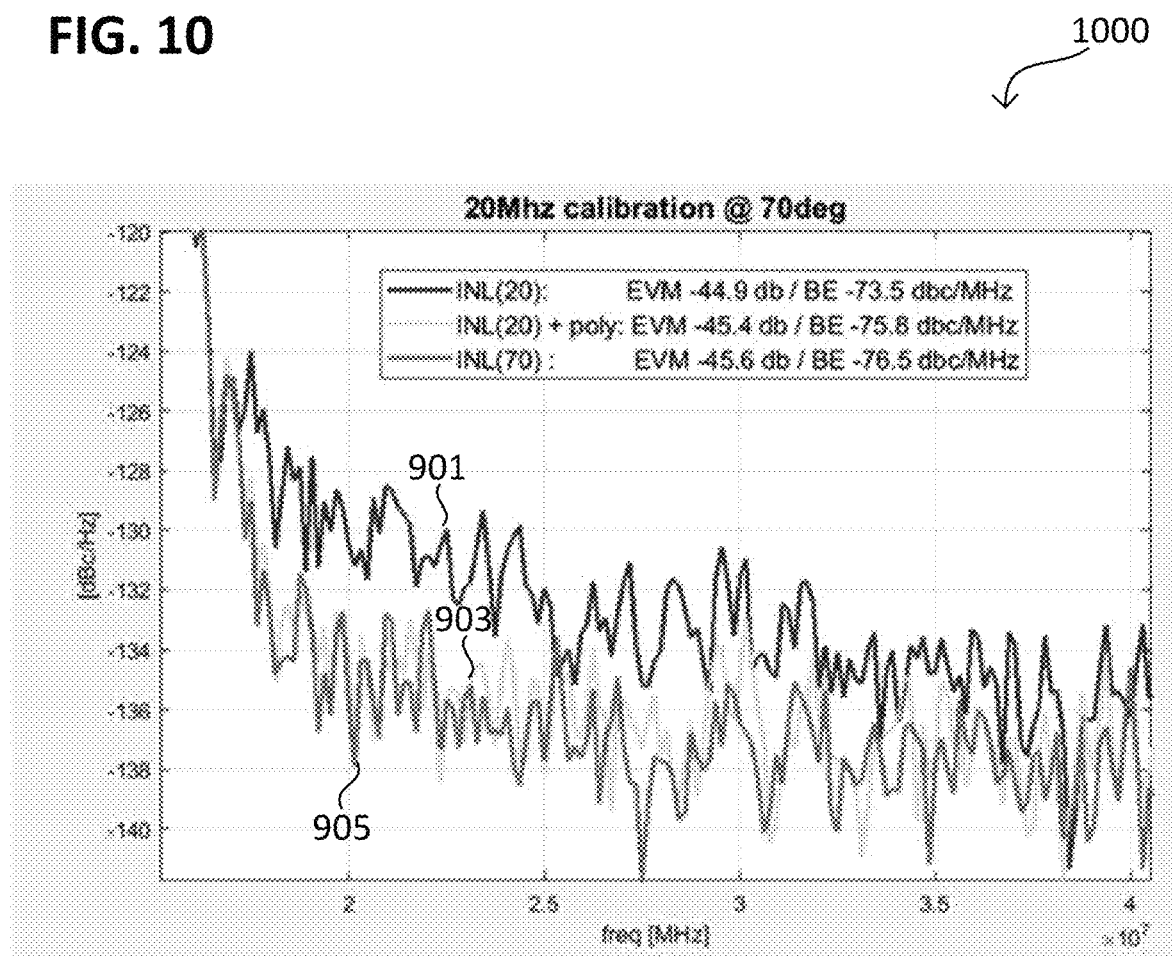

FIG. 10 illustrates the output of the DTC 400 according to various aspects in a schematic diagram 1000, depicting a detail of diagram 900.

As it can be seen, by adding the (e.g., polynomial) correction based on the temperature shift model, the degradation in the output is removed, and the performances almost match the ones with full calibration (which uses a much longer signal).

Figure 11:
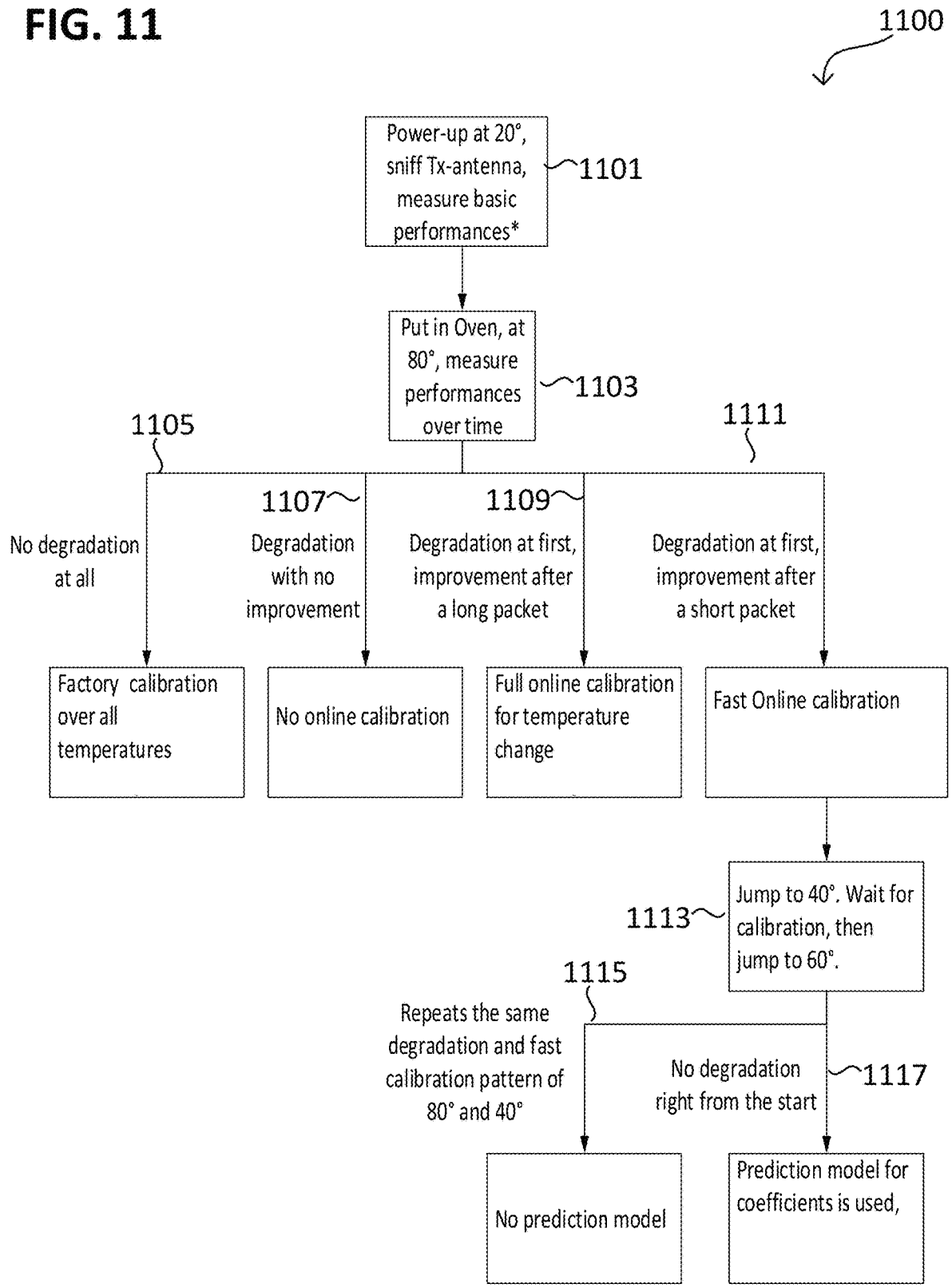
FIG. 11 shows a method for determining the performance of DTCs of various types and DTCs according to various aspects in a schematic flow diagram.

FIG. 11 illustrates a method for comparing the performance of DTCs of various types and a DTCs 400 according to various aspects in a schematic flow diagram 1100. The schematic flow diagram 1100 describes the aspects for testing a DTC. The setup is as follows. The DTC is put into an oven and the Tx antenna is sensed, e.g., by a vector signal analyzer (VSA) and/or a scope (oscilloscope). The performance may be determined by sensing the error vector magnitude (EVM)/masks, or by processing scope-samples by a multi-paradigm numerical computing program (e.g., MATLAB), to demodulate, and compare the required signal to the measured signal (this can be done, for example, with a WLAN-Rx/Tx-Modem simulation). This approach may generate all the desired impairments (PMPM, AMPM, etc.).

In 1101, the DTC is powered up at t=20°, and the Tx-antenna is sniffed to measure the basic performance of the DTC. In 1103, the DTC is put in an oven, at 80°, and its performance is sensed in dependency of the time.

In 1105, a DTC having a fixed factory designed compensation over all temperatures shows essentially no degradation of the performance. In 1107, a DTC having no temperature-shift-correction mechanism shows a degradation without improvement. In 1109, a DTC having a temperature-shift-correction mechanism implementing a full-online calibration shows a degradation at first, but an improvement after a long packet (that is, a long calibration time is required). In 1111, the DTC configured according to various aspects shows a faster online calibration (e.g., degradation at first, improvement after a short packet).

In 1113, the oven temperature is set to t=40°, a pause is made until the DTC has recalibrated, and subsequently the oven temperature is set to 60°.

If, in 1115, a DTC repeating the same degradation, but providing a fast calibration pattern at 60° and 40°, may indicate an impaired temperature-shift-correction mechanism. A more detailed analysis may reveal the actual reason of the behavior of the DTC in 1115, e.g., if the temperature-shift-correction mechanism needs to be updated as detailed herein. By way of contrast, in 1117, the DTC updated according to various aspects may show essentially no degradation right from the start.

Figure 12:
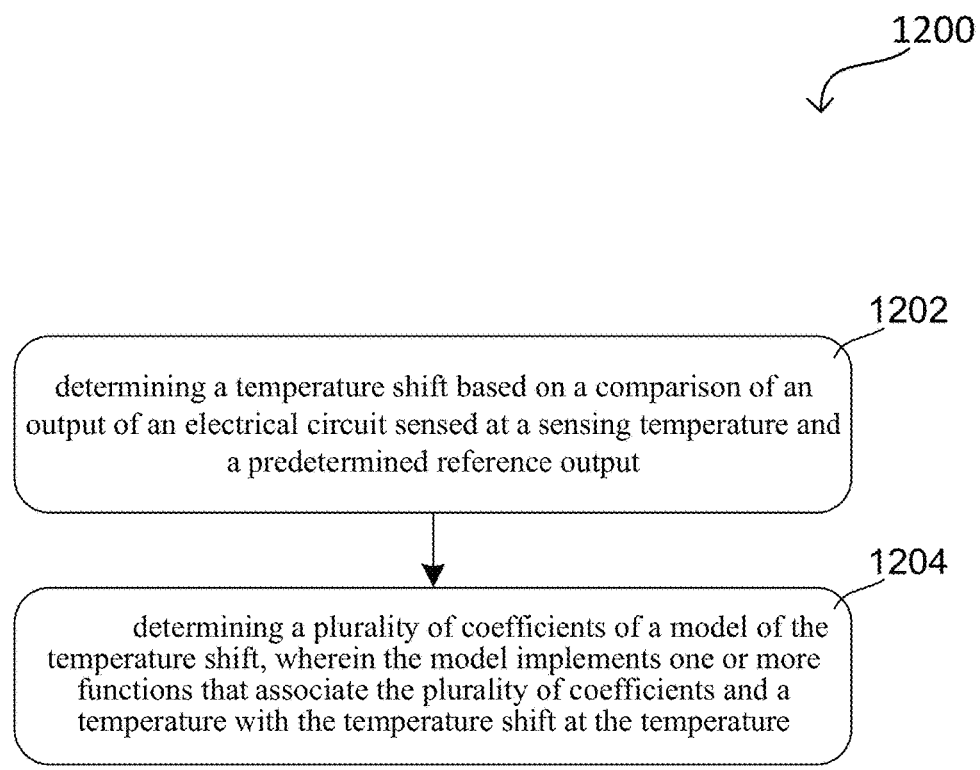
FIG. 12 shows a method for determining a model related to a temperature shift.

FIG. 12 depicts an exemplary method 1200 of determining a model related to a temperature shift. As shown in FIG. 12, method 1200 includes determining a temperature shift based on a comparison of an output of an electrical circuit sensed at a sensing temperature and a predetermined reference output (1202), representing an output of an electrical circuit at a reference temperature, and determining a plurality of coefficients of a model of the temperature shift, wherein the model implements one or more functions that associate the plurality of coefficients and a temperature with the temperature shift at the temperature (1204).

The following examples pertain to aspects of this disclosure:

Example 1 is a device (e.g., for modeling, for a facilitated understanding also referred to as modeling device), e.g., a computing device, including: one or more processors, configured to: determine a temperature shift (e.g., a temperature induced shift) based on a comparison of one or more outputs of an electrical circuit sensed at a sensing temperature and one or more predetermined reference outputs representing an output of the electrical circuit at a reference temperature; determine a plurality of coefficients of a model of the temperature shift (also referred to as temperature shift model), wherein the model implements one or more functions that associate the plurality of coefficients and a temperature with the temperature shift at the temperature; wherein the device optionally further includes a storage to store the one or more reference outputs representing the output of an electrical circuit at a reference temperature.

Example 2 is the device of example 1, wherein the one or more processors are further configured to: update a temperature-shift-correction mechanism (e.g., or store them therein) of the electrical circuit based on the plurality of coefficients (or the model as determined), e.g., by sending the plurality of coefficients to the temperature-shift-correction mechanism. This increases the accuracy of the actual electrical circuit.

Example 3 is the device of example 2, wherein the temperature-shift-correction mechanism is configured to adapt and/or control the electrical circuit (e.g., its output and/or operation) based on the plurality of coefficients and based on the temperature of the electrical circuit. This increases the accuracy of the actual electrical circuit.

Example 4 is the device of one of examples 1 to 3, wherein the reference output is an output of the electrical circuit sensed at the reference temperature, e.g., sensed by a sensor of the device. This increases the accuracy regarding the actual electrical circuit.

Example 5 is the device of one of examples 1 to 4, wherein the output at the sensing temperature is sensed by a sensor of the device. This increases the accuracy regarding the actual electrical circuit.

Example 6 is the device of one of examples 1 to 5, wherein the reference temperature and the sensing temperature differ from each other, e.g., by at least 20° C., e.g., by at least 40° C., e.g., by at least 60° C. This increases the accuracy.

Example 7 is the device of one of examples 1 to 6, wherein the temperature shift includes represents a deviation of the output of the electrical circuit sensed at the sensing temperature from the reference output (e.g., induced by temperature); and/or wherein the plurality of coefficients is determined based on the temperature shift. This increases the accuracy.

Example 8 is the device of one of examples 1 to 7, wherein the one or more functions further associate an input parameter with the temperature shift, wherein the input parameter represents the input of the electrical circuit.

Example 9 is the device of example 8, wherein the one or more functions associate the input parameter with the temperature shift in a non-linear (e.g., polynomial) manner. This increases the accuracy.

Example 10 is the device of one of examples 1 to 9, wherein determining the plurality of coefficients of the model includes: determining one or more temperature independent components of the one or more functions based on the comparison. This increases the accuracy.

Example 11 is the device of one of examples 1 to 10, wherein determining the plurality of coefficients of the model further includes: determine one or more temperature dependent components of the one or more functions based on one or more temperature dependent outputs of the electrical circuit, wherein optionally the model includes the one or more temperature dependent components composed with the one or more temperature independent components. This increases the accuracy.

Example 12 is the device of one of examples 1 to 11, wherein the model implements one or more further functions that associate the plurality of coefficients and the temperature with the temperature shift at the temperature, wherein the one or more functions and the one or more further functions differ from each other in their domain. This increases the accuracy.

Example 13 is the device of example 12, wherein the parameter ranges over at least two discrete intervals, including a first interval being the domain of the one or more functions and a second interval being the domain of the one or more further functions.

Example 14 is the device of one of examples 1 to 13, wherein determining the plurality of coefficients is based on the temperature shift determined based on the comparison.

Example 15 is the device of one of examples 1 to 14, wherein the one or more functions (each function of the one or more functions, e.g., each function implemented by the model) includes a polynomial; and/or wherein each function of the one or more functions (e.g., each function implemented by the model) is a continuous function.

Example 16 is the device of one of examples 1 to 15, wherein the temperature is an operating temperature of the electrical circuit.

Example 17 is the device of one of examples 1 to 16, wherein the one or more functions associate the temperature with the temperature shift in a linear manner. This reduces the computing time.

Example 18 is the device of one of examples 1 to 17, wherein the determination of the temperature shift is based on one or more sensed outputs of the electrical circuit. This increases the accuracy.

Example 19 is the device of one of examples 1 to 18, wherein a number of the coefficients of the model is less than 1000, e.g., less than 100, e.g., less than 50. This reduces the required storage capacity.

Example 20 is the device of one of examples 1 to 19, wherein a number of the coefficients of the model per function is less than 10, e.g., less than 6, e.g., less than 4. This reduces the required storage capacity.

Example 21 is the device of one of examples 1 to 20, wherein the determination of the plurality of coefficients includes a curve fitting. This reduces the computing time.

Example 22 is the device of example 21, wherein the determination of the plurality of coefficients includes a polymeric curve fitting. This reduces the computing time.

Example 23 is the device of one of examples 1 to 22, wherein the output of the electrical circuit at the sensing temperature is sensed over a first timeframe, wherein the first timeframe is less than a second timeframe (also referred to as reference timeframe), over which the reverence output is sensed, when the output of the electrical circuit at the sensing temperature is sensed after sensing the reference output; or wherein the first timeframe is more than the second timeframe, when the output of the electrical circuit at the sensing temperature is sensed before sensing the reference output. This reduces the influence of other error sources.

Example 24 is the device of one of examples 1 to 23, wherein the electrical circuit includes a digital-to-analog converter. This increases accuracy of operating the digital-to-analog converter.

Example 25 is the device of one of examples 1 to 24, wherein the electrical circuit includes a digital-to-time converter. This increases accuracy of operating the digital-to-time converter.

Example 26 is the device of one of examples 1 to 25, wherein the electrical circuit is part of a radio transmitter. This increases accuracy of operating the transmitter.

Example 27 is the device of example 26, wherein the transmitter is a digital transmitter (DTx). This increases accuracy of operating the digital transmitter.

Example 28 is a method (e.g., for modeling), including: determining a temperature shift based on a comparison of an output of an electrical circuit sensed at a sensing temperature and a predetermined reference output representing an output of an electrical circuit at a reference temperature; determining a plurality of coefficients of a model of the temperature shift, wherein the model implements one or more functions that associate the plurality of coefficients and a temperature with the temperature shift at the temperature, wherein the method may be further configured according to of one of examples 1 to 27.

Example 29 is the method of example 28, further including: updating a temperature-shift-correction mechanism of the electrical circuit based on the plurality of coefficients.

Example 30 is the method of example 29, further including: outputting a signal by the electrical circuit based on a signal input to the electrical circuit and based on the updated temperature-shift-correction mechanism.

Example 31 are one or more non-transitory computer-readable media storing instructions thereon that, when executed by at least one processor, direct the processor to perform the method according to of one of examples 28 to 30, e.g., to: determine a temperature shift based on a comparison of an output of an electrical circuit sensed at a sensing temperature and a predetermined reference output representing an output of an electrical circuit at a reference temperature; determine a plurality of coefficients of a model of the temperature shift, wherein the model implements one or more functions that associate the plurality of coefficients and a temperature with the temperature shift at the temperature.

Example 32 is s device (e.g., for modeling), including: means for determining a temperature shift (e.g., a temperature induced shift) based on a comparison of one or more outputs of an electrical circuit sensed at a sensing temperature and one or more predetermined reference outputs representing an output of the electrical circuit at a reference temperature; means for determining a plurality of coefficients of a model of the temperature shift (also referred to as temperature shift model), wherein the model implements one or more functions that associate the plurality of coefficients and a temperature with the temperature shift at the temperature; wherein the device optionally further includes means for storing the one or more reference outputs representing the output of an electrical circuit at a reference temperature, wherein the device optionally further includes means for performing one or more aspects of the method or the device according to of one of examples 28 to 31, respectively.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device for applying predistortion to account for non-linearities in an electrical circuit, the device comprising:
   a temperature sensor configured to sense a sensing temperature at an active output of the electrical circuit;
   one or more processors configured to:
   determine a base distortion of the electrical circuit at a reference temperature, wherein the base distortion is based on a comparison of a first output of the electrical circuit sensed at the reference temperature and a predetermined reference output representing a second output of the electrical circuit at the reference temperature;
   determine a plurality of coefficients of one or more functions that model a temperature-based distortion as a function of a temperature shift, wherein the temperature-based distortion represents distortion due to the temperature shift of the electrical circuit from the reference temperature to the sensing temperature;
   and
   adjust the active output of the electrical circuit based on the base distortion and the temperature-based distortion as the function of the plurality of coefficients and the temperature shift.

2. The device of claim 1,
a storage for storing a reference signal representing the predetermined reference output of the electrical circuit at the reference temperature.

3. The device of claim 1,
wherein the processor is configured to sense the first output of the electrical circuit at the sensing temperature over a first timeframe and to sense the predetermined reference output of the electrical circuit at the reference temperature over a second timeframe,
wherein the first timeframe is less than a second timeframe, when the first output of the electrical circuit at the sensing temperature is sensed after sensing the predetermined reference output; or
wherein the first timeframe is more than the second timeframe, when the first output of the electrical circuit at the sensing temperature is sensed before sensing the reference output.

4. The device of claim 1,
wherein the reference temperature and the sensing temperature differ from each other.

5. The device of claim 1,
wherein the one or more functions associate an input parameter with the temperature shift, wherein the input parameter represents an input of the electrical circuit.

6. The device of claim 5,
wherein the one or more functions associate the input parameter with the temperature shift in a non-linear manner.

7. The device of claim 1,
wherein the one or more functions comprise a polynomial.

8. The device of claim 1,
wherein the one or more functions model the temperature-based distortion as a function of the temperature shift in a linear manner.

9. The device of claim 1,
wherein a number of the plurality of coefficients is less than 10 per function.

10. The device of claim 1,
wherein a number of the plurality of coefficients is less than 1000.

11. The device of claim 1,
wherein the processor configured to determine the plurality of coefficients comprises the processor configured to perform a curve fitting.

12. The device of claim 1,
wherein the electrical circuit comprises a digital-to-time converter.

13. The device of claim 1,
wherein the electrical circuit is part of a radio transmitter.

14. The device of claim 1, wherein the electrical circuit comprises a power amplifier.

15. The device of claim 1, wherein the temperature-based distortion comprises a residual error as compared to the base-distortion.

16. The device of claim 1, wherein the one or more functions comprises a plurality of functions, wherein each function of the plurality of functions differs from one another in a discrete interval of the function.

17. A method for applying predistortion to account for non-linearities in an electrical circuit, the method comprising:
  sensing at an active output of the electrical circuit a sensing temperature;
  determining a base distortion of the electrical circuit at a reference temperature, wherein the base distortion is based on a comparison of a first output of the electrical circuit sensed at the reference temperature and a predetermined reference output representing a second output of the electrical circuit at the reference temperature;
  determining a plurality of coefficients of one or more functions that model a temperature-based distortion as a function of a temperature shift, wherein the temperature-based distortion represents distortion due to the temperature shift of the electrical circuit from the reference temperature to the sensing temperature; and
  adjusting the active output of the electrical circuit based on the base distortion and the temperature-based distortion as the function of the plurality of coefficients and the temperature shift.

18. The method of claim 17, the method further comprising:
  outputting the active output by the electrical circuit based on a signal input to the electrical circuit and based on the base distortion and the temperature-based distortion as the function of the plurality of coefficients and the temperature shift updated temperature-shift-correction mechanism.

19. One or more non-transitory computer-readable media storing instructions thereon that, when executed by at least one processor, direct the processor to:
  sense, via a temperature sensor, a sensing temperature at an active output of the electrical circuit;
  determine a base distortion of the electrical circuit at a reference temperature, wherein the base distortion is based on a comparison of a first output of an electrical circuit sensed at the reference temperature and a predetermined reference output representing a second output of the electrical circuit at the reference temperature;
  determine a plurality of coefficients of one or more functions that model a temperature-based distortion as a function of a temperature shift, wherein the temperature-based distortion represents distortion due to the temperature shift of the electrical circuit from the reference temperature to the sensing temperature; and
  adjusting the active output of the electrical circuit based on the base-distortion and the temperature-based distortion as the function of the plurality of coefficients and the temperature shift.

* * * * *